| United States Patent [19] | [11] Patent Number: 4,528,356 |
|---|---|
| Allen | [45] Date of Patent: Jul. 9, 1985 |

[54] PROCESS FOR PREPARING HIGHER MOLECULAR WEIGHT EPOXY RESINS

[75] Inventor: Roy A. Allen, Houston, Tex.

[73] Assignee: Shell Oil Company, Houston, Tex.

[21] Appl. No.: 634,831

[22] Filed: Jul. 26, 1984

[51] Int. Cl.³ .................. C08G 59/06; C08G 59/16
[52] U.S. Cl. ................................ 528/89; 528/110; 528/361
[58] Field of Search .............. 528/89, 110, 361

[56] References Cited

U.S. PATENT DOCUMENTS 3,749,758  7/1973  Gannon ................. 528/110 X
3,792,112  2/1974  Gannon et al. ......... 528/110 X

OTHER PUBLICATIONS

Gannon et al., "Resins from Epoxides and Dimethylolproprionic Acid", Chem. Abst. 78, 137439c, (1973).

*Primary Examiner*—Earl A. Nielsen
*Attorney, Agent, or Firm*—Dean F. Vance

[57] ABSTRACT

The present invention is directed to an improved process for preparing higher molecular weight polyepoxides from lower molecular weight polyepoxides which comprises reacting (1) a lower molecular weight polyepoxide, (2) a polyhydric compound, (3) an etherification catalyst and (4) dimethylol propionic acid.

6 Claims, No Drawings

PROCESS FOR PREPARING HIGHER MOLECULAR WEIGHT EPOXY RESINS

FIELD OF THE INVENTION

The present invention is directed to a process for preparing higher molecular weight epoxy resins from lower molecular weight epoxy resins, and to curable compositions made therefrom.

BACKGROUND OF THE INVENTION

Processes for the preparation of higher molecular weight resins from lower molecular weight liquid epoxy resins are known. See, for example, U.S. Pat. Nos. 3,477,990, 3,547,881, 3,978,027, 3,824,212, and 4,320,222.

Simply, these processes comprise reacting a lower molecular weight polyepoxide (i.e., below about 3500) with a polyhydric phenol in the presence of an etherification catalyst to produce higher molecular weight solid polyepoxides. These solid polyepoxides may then be cured with conventional epoxy resin curing agents such as amines, anhydrides, mercaptans, imidazols, etc. to product coatings, adhesives, castings, etc. Also, these so-called fusion polyepoxides may be reacted with various compounds to produce adducts which are useful as curing agents for other polyepoxides or adducts which may be cured with epoxy curing agents depending upon the relative stoichiometry of the adducting reaction.

Although the above fusion technique is the preferred method for preparing solid polyepoxides, an older method is still used which comprises reacting a polyhydric phenol such as Bisphenol A with epichlorohydrin in the presence of an etherification catalyst followed by a dehalogenation step.

This so-called conventional resin has been utilized in various water borne primer and coating formulations. For example, such solid epoxy resin has been adductd with aromatic acids such as paraaminobenzoic acid (PABA) to produce water-borne primer coatings. See, for example U.S. Pat. Nos. 4,094,844, 4,098,744 and 4,119,609.

It was found that when the solid epoxy resin prepared by the fusion techniques were used in such water borne compositions such as the PABA systems, the resulting formulations do not exhibit viscosities which are acceptable for many applications.

It has now been found that fusion epoxy resins possessing an acceptable viscosity range and increased primary hydroxyl functionality can be prepared by a modified fusion process.

SUMMARY OF THE INVENTION

The present invention is directed to an improved process for preparing higher molecular weight polyepoxides from lower molecular weight polyepoxides which comprises reacting (1) a lower molecular weight polyepoxide, (2) a polyhydric compound, (3) an etherification catalyst and (4) dimethylol propionic acid.

DESCRIPTION OF THE INVENTION

The present invention is particularly directed to a process for preparing higher molecular weight polyepoxides (solid resins) by reacting (1) a lower molecular weight polyepoxide, preferably a normally liquid polyepoxide containing at least one vicinal epoxy group, (2) a polyhydric phenol, (3) a catalytic amount of an etherification catalyst and (4) from about 1 to about 5% by weight based on the weight of the polyepoxide of dimethylol propionic acid.

The Polyepoxides

Although normally liquid epoxides are suitable in the present compositions, semi-solid epoxy resins as well as mixtures of solid and liquid resins are useful.

The liquid polyepoxides employed in the present invention include those compounds possessing more than one vic-epoxy group per molecule, i.e., more than one

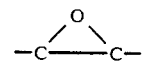

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 300 and about 900 and a epoxide equivalent weight of between about 140 and about 500. Especially preferred are the glycidyl polyethers of 2,2-bis(4-hydroxyphenyl)propane having an average molecular weight of between about 300 and about 900, an epoxide equivalent weight of between about 140 and about 500, and containing from about 0.1% to about 1.0% weight or higher saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

The Phenols

Suitable phnols include those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)-pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

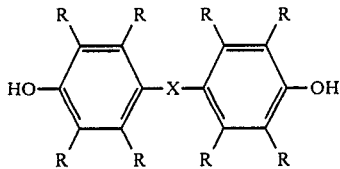

wherein X is a polyvalent element or radical and R independently is a member of the group consisting of hydrogen, halogen and hydrocarbon radicals. The preferred element or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals.

Various examples of phenols that may be used in the invention are also given in U.S. Pat. No. 3,477,990 (e.g., column 5, line 1 to column 6, line 10) and it is to be understood that so much of the disclosure of that patent relative to examples of phenols is incorporated by reference into this specification.

The Etherification Catalysts

In general, all the usual esterification and etherification catalysts are suitable for use in the present fusion process and a multitude are known to those skilled in the art. Suitable such catalysts include the phosphonium halide salts as disclosed in U.S. Pat. No. 3,477,990; the phosphines as disclosed in U.S. Pat. No. 3,547,881; potassium iodide as discussed in U.S. Pat. No. 3,978,027; ammonium halides as disclosed in U.S. Pat. No. 3,824,212; and combination catalysts as disclosed in U.S. Pat. No. 4,320,222.

Accordingly, the disclosures relative to suitable etherification catalysts in the above-noted U.S. patents are incorporated herein by reference.

The amount of etherification catalyst will be an effective or catalytic amount and will vary over a wide range. In general, the amount of catalyst will vary from about 0.001% to about 10% by weight of the polyepoxide, and preferably from about 0.05% to about 5% by weight.

In many instances, particularly in commercial applications, the etherification catalyst is added to the polyepoxide and stored as a stable composition. See, for example, U.S. Pat. No. 3,477,990. Accordingly, such a composition is referred to in the art and herein as a "pre-catalyzed epoxide".

The amount of the pre-catalyzed epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols. If an epoxide terminated product is desired, higher mole ratios of diepoxide should be employed.

Superior results are obtained when the higher molecular weight resins are produced and in this case the ratios of reactants are varied depending upon the molecular weight desired and upon the type of end groups, i.e., whether the product is to be terminated with an epoxide or with a phenol.

In general, the epoxide compound and etherification catalyst, or precatalyzed epoxide is mixed with the phenol and dimethylol propionic acid (DMPA) and the mixture heated to a temperature from about 90° C. to about 200° C. for a period to complete the reaction, i.e., from about 1 to about 3 hours.

The reaction is conducted in the presence or absence of solvents is easily effected without the addition of solvents or dilents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

This so-called fusion technique is well-known and is more fully described in U.S. Pat. Nos. 3,477,990, and 4,320,222 and such description is hereby incorporated herein by reference.

The solid fusion resins proposed by reacting the lower molecular weight precatalyzed saturated resins with a polyhydric phenol can be reacted with conventional epoxy curing agents to form hard, insoluble, infusible products.

Examples of suitable curing agents include, among others, the poly-basic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and/or carboxyl groups; and others.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to given on active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amine-containing curing agents generally cure at or near ambient temperature and no heat be applied. The acids, anhydrides, and melamine derivatives, on the other hand, generally require heat, such as temperatures ranging from about 65° C. to about 210° C. Preferred temperatures range from about 90° C. to about 210° C. and more preferably from about 120° C. to about 195° C.

The higher molecular weight resins prepared by the present process are preferably utilized to produce water-borne primer coatings according to the processes of U.S. Pat. Nos. 4,094,844, 4,098,744 and 4,119,609, among others.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Epoxy Resin A is a diglycidyl ether of 2,2-bis(4-hydroxyphenyl)propane having an average molecular weight of about 380 and a weight per epoxy (WPE) of about 190 containing 0.1% ethyl triphenyl phosphonium iodide and about 3% organic solvent (80–85% xylene and 15–20% etherglycol).

MEK is methyl ethyl ketone.

EXAMPLE 1

Into a reactor equipped with a stirrer and nitrogen blanket were placed the following:

| Component | % Wt. |
| --- | --- |
| Epoxy Resin A | 72.00 |

-continued

| Component | % Wt. |
| --- | --- |
| Bisphenol A | 26.30 |
| Dimethylol propionic acid | 1.70 |
| | 100.00 |

The above mixture was heated to 116° C. (240° F.) over a 40 minute period. At 116° C. the mixture was heated to 183° C. (360° F.) (~1° C. per minute) over a 60 minute period. At 183° C., the temperature was raised to 193° C. (380° F.) over a 10–20 minute period and the temperature was held at 198° C. for 30 minutes. The resulting epoxy resin had the following typical final constants:

| | Viscosity (40% NV in MEK, sec. | Weight per epoxy (WPE) | #4 FORD Cup Viscosity, Sec. |
| --- | --- | --- | --- |
| Run 1 | 12.3 | 834 | 54 |
| Run 2 | 13.0 | 852 | 69 |
| STD Fusion Resin (no DMPA) | 21.5 | 874 | 23 |

The specification range for Ford Cup Viscosity required for subsequent reaction with p-aminobenzoic acid to produce acceptable water-borne coatings is 50 to 70 seconds. Accordingly, p-aminobenzoic acid adducts of the resins from Runs 1 and 2 were acceptable in a commercial formulation wherein the adduct from the conventional fusion resin was unacceptable.

What is claimed is:

1. A process for preparing higher molecular weight polyepoxides from lower molecular weight polyepoxides which comprises reacting (1) a lower molecular weight epoxy resin having at least one vicinal epoxy group per molecule, (2) a polyhydric compound, (3) an etherification catalyst and (4) dimethylol propionic acid.

2. The process of claim 1 wherein the epoxy resin is a glycidyl polyether of 2,2-bis(4-hydroxyphenyl)propane.

3. The process of claim 1 wherein the polyhydric is a polyhydric phenol.

4. The process of claim 3 wherein the polyhydric phenol is 2,2-bis(4-hydroxyphenyl)propane.

5. The process of claim 1 wherein the etherification catalyst is a phosphonium halide.

6. The process of claim 1 wherein the dimethylol propionic acid is utilized in an amount from about 1% to about 5% by weight based on the weight of the epoxy resin.

* * * * *